US010726071B2

(12) United States Patent
Taycher et al.

(10) Patent No.: US 10,726,071 B2
(45) Date of Patent: Jul. 28, 2020

(54) CONTENT SEARCH ENGINE

(71) Applicant: Kensho Technologies, LLC, Cambridge, MA (US)

(72) Inventors: Leonid Taycher, Newton, MA (US); Samantha Whitmore, Cambridge, MA (US); Predrag Gruevski, Cambridge, MA (US); Colin Carroll, Andover, MA (US); Carolyn Ranti, Somerville, MA (US); Benjamin Cohen, Cambridge, MA (US); Eugene Yurtsev, Cambridge, MA (US); Matthew Taylor, Belmont, MA (US); Adam Broun, Lexington, MA (US)

(73) Assignee: Kensho Technologies, LLC, Cambridge, MA (US)

( * ) Notice: Subject to any disclaimer, the term of this patent is extended or adjusted under 35 U.S.C. 154(b) by 245 days.

(21) Appl. No.: 15/477,964

(22) Filed: Apr. 3, 2017

(65) Prior Publication Data
US 2018/0218011 A1 Aug. 2, 2018

Related U.S. Application Data

(60) Provisional application No. 62/454,039, filed on Feb. 2, 2017.

(51) Int. Cl.
*G06F 16/901* (2019.01)
*G06Q 30/02* (2012.01)
(Continued)

(52) U.S. Cl.
CPC .... *G06F 16/9024* (2019.01); *G06F 16/24568* (2019.01); *G06F 16/9535* (2019.01);
(Continued)

(58) Field of Classification Search
CPC ............. G06F 16/9024; G06F 16/9535; G06F 16/24568; G06F 16/9038; G06F 16/322;
(Continued)

(56) References Cited

U.S. PATENT DOCUMENTS 6,081,797 A 6/2000 Hittt
8,341,143 B1 12/2012 Karls et al.
(Continued)

OTHER PUBLICATIONS

International Search Report, International Application No. PCT/US2017/034847, dated Jul. 28, 2017; 15 pages.
(Continued)

*Primary Examiner* — Robert W Beausoliel, Jr.
*Assistant Examiner* — Mohammad Solaiman Bhuyan
(74) *Attorney, Agent, or Firm* — Fish & Richardson P.C.

(57) ABSTRACT

Methods, systems, apparatus, including computer programs encoded on computer storage medium, for predicting an outcome in response to a detected event. In one aspect, the method includes actions of maintaining a database of data records with a knowledge graph, receiving a stream of real-time data that includes data records, and from time-to-time as the real-time data is received: identifying a set of one or more attributes associated with a real-time event represented by one of the data records received, identifying a data record in the knowledge graph representing an event-outcome pair, determining that an event of the event-outcome pair has historically been associated with triggering an outcome of the event-outcome pair, and, executing a set of rules defining logic associated with the event-outcome pair specifying that the outcome will occur at a time that is subsequent to a time in which the one of the data records is received.

25 Claims, 3 Drawing Sheets

(51) Int. Cl.
  *G06F 16/9535*  (2019.01)
  *G06N 5/02*    (2006.01)
  *G06N 5/04*    (2006.01)
  *G06F 16/2455* (2019.01)
  *G06F 16/31*   (2019.01)
  *G06Q 10/06*   (2012.01)
  *G06F 16/9038* (2019.01)

(52) U.S. Cl.
  CPC .............. *G06N 5/022* (2013.01); *G06N 5/04* (2013.01); *G06Q 30/0269* (2013.01)

(58) Field of Classification Search
  CPC ...... G06Q 30/0269; G06Q 10/06; G06N 5/00; G06N 5/04; G06N 5/022
  See application file for complete search history.

(56) References Cited

U.S. PATENT DOCUMENTS

| | | | |
|---|---|---|---|
| 9,411,857 | B1 | 8/2016 | Chechik et al. |
| 9,792,259 | B2* | 10/2017 | Heinz ............... G06F 16/24568 |
| 2009/0089108 | A1 | 4/2009 | Angell et al. |
| 2011/0225289 | A1 | 9/2011 | Prasad et al. |
| 2012/0047445 | A1 | 2/2012 | Rajagopal |
| 2014/0207705 | A1 | 7/2014 | Strauss et al. |
| 2015/0127632 | A1 | 5/2015 | Khaitan et al. |
| 2015/0331877 | A1* | 11/2015 | Lou ....................... G06F 16/288 707/722 |
| 2017/0177446 | A1* | 6/2017 | MacLean ............ G06F 11/1451 |
| 2017/0330106 | A1* | 11/2017 | Lindsley .................. G06N 5/02 |
| 2018/0060733 | A1* | 3/2018 | Beller ...................... G06N 5/02 |
| 2018/0150750 | A1* | 5/2018 | Verdejo .................. G06F 9/542 |

OTHER PUBLICATIONS

International Searching Authority, International Search Report and Written Opinion, PCT/US2017/053957, dated Nov. 10, 2017, 16 pages.

International Searching Authority, International Search Report and Written Opinion, PCT/US2017/035074, dated Oct. 17, 2017, 18 pages.

* cited by examiner

CONTENT SEARCH ENGINE

CROSS-REFERENCE TO RELATED APPLICATIONS

This application claims the benefit of U.S. Provisional Application No. 62/454,039, filed Feb. 2, 2017, the disclosure of which is incorporated herein by reference.

BACKGROUND

This specification related to search engines

A search engine may generally be described as any program that executes a search and retrieves stored data. However, based on the task at hand, a search engine can be configured in a variety of different ways. For example, some search engines may be configured to perform keyword-based search and retrieval. Such search engines may identify relevant search results based, at least in part, on the number of times a search term appears in a particular resource, or the particular resource's metadata. Alternatively, or in addition, some search engines may identify relevant search results by identifying an entity name that is associated with one or more search terms, and then determining the number of occurrences of the entity name in one or more particular resources. In such instances, relevant search results may be obtained based on the number of occurrences of the entity name in the one or more particular resources. The aforementioned ways that a search engine can identify search results responsive to a query are merely exemplary.

A search engine can also be configured to improve a search system by configuring the way that stored data is managed. Stored data can be managed for example by using particular data structures that can improve the operation of a search engine by helping a system identify useful data that they system, or a user of the system, may not otherwise have found and used if not for the particular way in which the underlying data was managed.

SUMMARY

According to one innovative aspect of the present disclosure, a method performed by a data processing apparatus for predicting an outcome in response to a detected event is disclosed. In one aspect, the method may include actions of maintaining a database of entity data records using a knowledge graph, receiving a stream of real-time data that includes data records; and from time to time as the stream of real-time data is received: identifying, based on the stream of real-time data, a set of one or more attributes associated with a real-time event represented by one of the received data records, identifying, based on one or more attributes, data in the knowledge graph representing an event-outcome pair, determining whether the event of the event-outcome pair has historically been associated with triggering the outcome of the event-outcome pair, and in response to determining that the event of the event-outcome pair has historically been associated with triggering the outcome in the event-outcome pair, executing a set of rules defining logic associated with the event-outcome pair that is configured to generate one or more parameter values that specify that the outcome will occur at a time that is subsequent to a time in which the one of the data records is received.

Other versions include corresponding systems, apparatus, and computer programs to perform the actions of methods, encoded on computer storage devices.

These and other versions may optionally include one or more of the following features. For instance, in some implementations, the method further includes in response to determining that the event of the event-outcome pair has not historically been associated with triggering the outcome in the event-outcome pair, providing negative feedback that weakens the relationship between the occurrence of the event in the event-outcome pair and the outcome entity in the event-outcome pair.

In some implementations, the method may further include generating an alert for output on the display of a user device that includes data indicative of the specified outcome. Alternatively, or in addition, the method may further include generating an alert for transmission to a computer that includes data indicative of the specified outcome.

In some implementations, the set of rules may define logic for generating an alert that includes data indicative of the specified outcome.

In some implementations, the method may further include obtaining data indicative of facts related to one or more real-time events, determining, based on the obtained data indicative of facts related to the one or more real-time events, a relationship between at least a first entity and a second entity in the knowledge graph that did not previously exist, determining whether the first entity has historically been associated with triggering the occurrence of the second entity and, in response to determining whether the first entity has historically been associated with triggering the occurrence of the second entity, storing the first entity and the second entity as an event-outcome pair.

In some implementations, the method may further include obtaining data indicative of facts related to one or more real-time events, determining, based on the obtained data indicative of facts related to the one or more real-time events, that a relationship should not exist between at least a first entity and a second entity in the knowledge graph, wherein a relationship previously existed between the first entity and the second entity, determining whether the first entity has historically been associated with triggering the occurrence of the second entity, and in response to determining that the first entity has not historically been associated with triggering the second entity, removing the relationship between the first entity and the second entity in the knowledge graph.

In some implementations, determining whether an event of the event-outcome pair has historically been associated with triggering an outcome of the event-outcome pair may further include: determining whether the event of the event-outcome pair has been determined to trigger the particular outcome of the event-outcome pair more than a threshold amount of time.

The subject matter of the present disclosure provides multiple advantages over conventional methods. For instance, the present disclosure achieves a prediction of an outcome in response to a detected event in a manner that is faster than conventional methods. The increase in speed is based, at least in part, on the preprocessing of data projections in advance so that the system does not need to traverse every path through the knowledge graph in response to each query. As a result, query results can be provided in near real-time, thereby reducing latency involved predicting an outcome in response to an event.

Other aspects of the subject matter disclosed by this system also contribute to the increase in speed in predicting an outcome in response to a detected event. For example, the knowledge graph is stored in volatile memory thereby making the process run much faster than a system that maintains the knowledge graph on hard disk. In addition, the knowledge graph includes a main stem graph and a plurality of child graphs. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, and thereby increasing the overall performance speed of the disclosed system.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
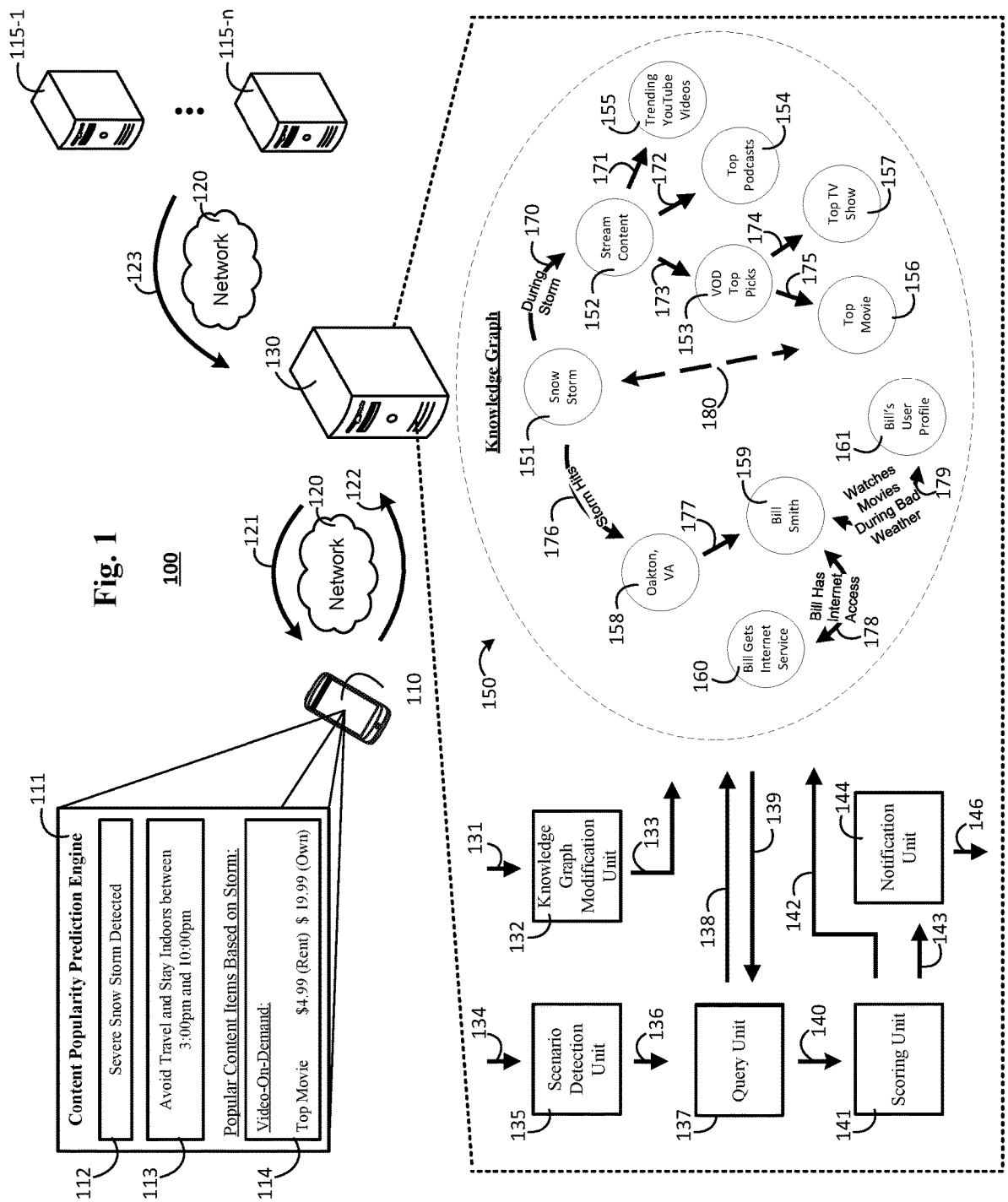
FIG. 1 is a conceptual diagram of an example of a search engine that provides a predicted outcome in response to a detected event.

FIG. 1 is a conceptual diagram of an example of a search engine system 100 that provides a predicted outcome in response to a detected event. The search engine system 100 includes a user device 110, one or more feed servers 115-1 to 115-n, a network 120, and a server 130.

The server 130 includes a knowledge graph modification unit 132, a scenario detection unit 135, a query unit 137, a scoring unit 141, a notification unit 144, and a knowledge graph 150. The server 130 is configured to receive real-time data feeds provided 123 by the one or more feed servers 115-1 to 115-n via the network 120. The network 120 may include, for example, one or more of a LAN, a WAN, a cellular network, the Internet, or a combination thereof. The real-time data feeds may include documents such as news articles, weather reports, financial reports, or the like. The real-time data feeds may include unstructured information, structured information, or a combination thereof. The server 130 may provide 131 the received real-time data feeds to a knowledge graph modification unit 132.

The knowledge graph modification unit 132 is configured to detect an occurrence of one or more entities in a received real-time data feed. An entity may include, e.g., a person, a company, corporation, a government agency, a government official, an asset, an event, a media content item, a country, a city, a state, entity profiles, or the like. Events may include the name (or type) of event and a date of the event. Events may include, for example, storms (e.g., a hurricane, a tornado, a blizzard, a flood, a thunderstorm, a snowstorm, an ice storm, a hail storms, or the like), a terrorist attack, an act of nature (e.g., an earthquake), an environmental disaster (e.g., oil spill), corporate appointments (or resignations), governmental appointments (or resignations), mergers or acquisitions, a product launch, a speech by a government official, an interest rate changes, an asset price movement, an election, tweets from high profile individual, or the like. References to one or more entities may be included within a real-time data record received in a real-time data feed from one or more feed servers 115-1 to 115-n.

The knowledge graph modification unit 132 may process each received real-time data record in a real-time data feed. Processing a received data record by the knowledge graph modification unit 132 may include, for example, processing the real-time data record to identify the occurrence of one or more candidate entity names. Identifying the occurrence of one or more candidate entity names may include, for example, analyzing the text of a real-time data record to detect a string of text that is similar in structure to that of known entity names. In some implementations, the occurrence of context information may also be identified in the real-time data record. Context information may include one or more other words in the real-time data record that may provide information regarding the use of the candidate entity name in the real-time data records.

Analyzing the context related to the use of the candidate entity name in the real-time data record may help server 130 determine, for example, the difference between "Apple" the company and "Apple" the fruit. For example, if an analysis of a real-time data record determines that the real-time data record includes the term "Apple" and the term "iPhone," it is likely that the term "Apple" in the real-time data record is associated with the company Apple. Alternatively, if an analysis of a real-time data record that also includes the term "Apple" includes the term "orchard," then it is likely that the real-time data record is associated with the fruit Apple. Accordingly, analyzing the context in which a candidate entity term is used can help to disambiguate the candidate entity term.

The knowledge graph modification unit 132 may extract one or more features from (i) the identified candidate entity name, (ii) the context information, or (iii) a combination thereof. The one or more features may include data that can be used to numerically represent (i) the identified candidate entity name, (ii) the context information, or (iii) a combination thereof. The knowledge graph modification unit 132 may determine, based on the comparison of (i) the generated feature vector and (ii) one or more disambiguated entity names, whether or not the identified candidate entity is currently maintained by the knowledge graph 150.

The knowledge graph modification unit 132 may update the knowledge graph 150 in response to determining that the candidate entity represented by the generated feature vector is associated with one of the disambiguated entity names in the knowledge graph. For example, in some instances, the knowledge graph modification unit 132 may determine that the feature vector generated for the identified candidate entity is sufficiently similar to an entity of the knowledge graph 150 such as entities 151, 152, 153, 154, 155, 156, 157, 158, 159, 160, 161. For example, a real-time news article may be received that references a trending YouTube video. In such instances, the knowledge graph modification unit may associate the trending YouTube video detected in the real-time data record with the entity 155. In other instances, the knowledge graph modification unit 132 may determine that there are no entities 151, 152, 153, 154, 155, 156, 157, 158, 159, 160, 161 in the knowledge graph 150 that are sufficiently similar to the generated feature vector that represents the candidate entity. In such instances, the knowledge graph modification unit 132 may generate a new entity root node. For example, the knowledge graph modification unit 132 may receive a real-time data record and identify a candidate entity of a hurricane. In such an instance, the knowledge graph modification unit 132 may generate a new entity root node in knowledge graph 150 for a hurricane.

Alternatively, the knowledge graph modification unit 132 may generate a new root node "storm" or "weather," and then categorize the "snow storm" and "hurricane" under the new root node (e.g., "storm," "weather," or the like).

The knowledge graph modification unit 132 can add a new entity to the knowledge graph using a template. The template provides an interface between the knowledge graph modification unit 132 and the knowledge graph 150 schema. The template includes a field for each attribute of a particular entity type. For example, a storm entity type may include a field for a type of precipitation, wind speed, expected precipitation, location of storm, and the like. Alternatively, a top movie entity type may include, for example, a title of the movie, the genre of the movie, a popularity rating for the movie, or the like. The server 130 may populate necessary fields that are minimally required for the type of entity being added to the knowledge graph 150. Then, the server 130 may provide the template to the knowledge graph 150. The knowledge graph 150 can generate a new entity node based on the data included in the retrieved template.

Alternatively, or in addition, a template may provide a human to graph interface. For example, a human and the graph may understand a federal reserve meeting as two different things. A template may be used to receive data from a user related to the federal reserve meeting (e.g., start of meeting, end of meeting, tone, interest rate action, etc.). Then, the graph may use this single meeting to generate several events that can be queried independently such as rate action, trend in the federal reserve's tone, etc.). It is the template that facilitates this different understanding of the federal reserve meeting by the user and the graph.

The knowledge graph 150 is a data structure that can be used to store relationships that exist between entities. At a particular point in time t the knowledge graph 150 may be initialized to include (i) an initial set of entities such as entities 151, 152, 153, 154, 155, 156, 157, 158, 159, 160, 161 that are represented in the knowledge graph 150 as a node and (ii) an initial set of known relationships between entities such as relationships 170, 171, 172, 173, 174, 175, 176, 178, 179. Then, beyond time t, the server 130 may employ one or more algorithms that analyze, from time to time, the data maintained by the knowledge graph 150 in order to discover new relationships between entities that can be inferred based on one or more facts that are either (i) obtained as a real-time data record from one or more servers 115-1 to 115-n via the network 120, or (ii) inferred from the relationships 170, 171, 172, 173, 174, 175, 176, 178, 179 established by the knowledge graph 150.

The knowledge graph 150 shown in FIG. 1 is an example of at least a portion of a knowledge that can be employed by system 100. In some implementations, the knowledge graph 150 may be a child graph of a main stem graph.

For example, the knowledge graph includes a main stem graph and a plurality of child graphs. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, as only a portion of the entire knowledge graph corresponding to a particular child graph needs to be searched in order to process a search query, thereby increasing the overall performance speed of the disclosed system.

In some implementations, one or more portions of the knowledge graph may be analyzed to determine whether the portion of the knowledge graph is a candidate for being divided to create one or more new child knowledge graphs. Portion of the knowledge graph may be divided to create one or more new knowledge graphs when, e.g., it is determined that a particular one or more users requires access to a particular portion of the knowledge graph and no other users other than the particular one or more users also needs access to the particular portion of the knowledge graph. Alternatively, a new child graph may be created that begins to consume, e.g., receive and store updates and begins its own knowledge graph creation and maintenance operations.

Discovery of a new relationship between two or more entity nodes may occur at some point after time t, which is the time that the knowledge graph 150 was initialized. Discovery of a new relationship between two or more entity nodes may begin with the server 130 obtaining data indicative of one or more facts related to entities in the knowledge graph. In the example of FIG. 1, facts related to entities in the knowledge graph 150 may include, for example, a determination, based on relationship 170, that people stream content during a snow storm. In addition, facts related to the entities in the knowledge graph 150 also include, for example, a determination, based on relationship 176 that a snow storm is hitting (or will hit) Oakton, Va. Similarly, the knowledge graph 150 also establishes facts based on relationships 177, 178, 179, respectively, that Bill Smith lives in Oakton, Va., that Bill Smith has internet access, and that Bill Smith's viewing history indicates that Bill Smith watches movies during bad weather.

The server 130 may analyze the obtained data indicative of facts based on relationships 170, 176, 177, 178, 179 of the knowledge graph 150 to determine whether a relationship between two or more entities can be inferred based on the fact data. In some implementations, analyzing obtained data indicative of facts based on one or more relationships established by the knowledge graph 150 may include, for example, starting at an entity node that is indicative of an event, and analyzing facts related to the event to determine entities effected by the event, capabilities of entities effective by the event, actions historically taken during (or in response to) the event, a combination thereof, or the like.

Based on the analysis of the facts related to the event entity "snow storm," 151, the server 130 can infer a relationship 180 between the event entity "snow storm" 151 and the "top movie" entity 156 that can be used to potentially create an event-outcome pair for "Bill Smith." This relationship 180 can be inferred because the Knowledge Graph knows that during storms 170 users stream content. Furthermore, the storm hits 176 "Oakton, VA," and "Bill Smith" lives in "Oakton, VA" 177, has "Internet Access" 178, and his usage history 179 shows that he "Watches Movies During Bad Weather."

In some implementations, after discovery of the relationship 180, the server 130 can determine whether to save the discovered relationship as an event-outcome pair. An event-outcome pair may include, for example, and pairing of entities including an event entity and a non-event entity that is a content item that a user such as Bill Smith may be interested in based on the occurrence of the event represented by the event entity. For example, it is snowing in Oakton, so it is likely that Bill Smith will want to purchase the top rated video on demand movie. Before saving the relationship 180 as an event-outcome pair, the server 130 can evaluate relationship 180 to determine whether the event entity (e.g., "snow storm") has historically been associated with triggering the particular non-event entity (e.g., purchase of "top movie" from video on demand). This may include, for example, searching video on demand usage history maintained by the knowledge graph, and determining whether there is a historical relationship between known "snow storms" and increased purchases of a "top movie" from video on demand services. If it is determined that there is a historical relationship between a "snow storm" event 151 and an increase in "top movie" 156 video on demand purchases, the server 130 may store the relationship 180 as an event-outcome pair. An event entity may have historically been associated with triggering the particular non-event entity if the event entity was determined to trigger the particular non-event entity more than a threshold amount of time.

Outcome-pairs may be personally customizable to the extent that a discovered outcome-pair may be stored only for one particular person. Alternatively, a discovered outcome-pair may be stored globally for use by multiple users.

In some implementations, the server 130 can also evaluate existing relationships (e.g., relationships existing at time t, relationships discovered and saved during an update to the knowledge graph 150 at a time later than time t, etc) such as relationship 170. That is, the server 130 can evaluate the relationship 170 to determine whether the event entity (e.g., "snow storm") has historically been associated with triggering the particular non-event entity (e.g., "stream content"). This may include, for example, searching records maintained by the knowledge graph 150 related to internet usage during "snow storm" 151. If it is determined that there still exists a historical relationship between the event entity "snow storm" 151 and the entity "stream content: 152, then the server 130 can leave the relationship 170 unchanged. Alternatively, if it is determined that there is no longer a historical relationship between a "snow storm" 151 and user decisions to "stream content," the server 130 can remove the relationship 170 from the knowledge graph 150. Similar tests regarding the strength of one or more links may be periodically run as new entities are added and removed from the knowledge graph 150 by the knowledge graph modification unit 132.

The example scenario described with respect to the knowledge graph 150 of FIG. 1 relates to an event such as a "snow storm" hitting a town "Oakton, VA," however the present disclosure need not be so limited. For example, the knowledge graph can be used to predict price movements of one or more financial assets in response to a news event. By way of example, a knowledge graph could include an event entity node of "Flood In Thailand." An examination of the facts established by the knowledge graph that includes an event entity node of a "Flood In Thailand" includes data indicating that material to make magnets is mined in Thailand, that the amount of material mined to make magnets goes down in response to the Thai floods and that the supply of magnets provided to an American Company that makes hard drives is below normal as a result. Based on these facts, a server such as server 130 could infer that the stock price of the American Company will drop based on the "Flood In Thailand." The server 130 could also performing backtesting to determine whether there is a historical relationship between floods in Thailand and the American Company's stock price. If the backtesting confirms that there is a historical relationship between the event entity "Flood In Thailand" and the stock price of the American Company dropping, then the server 130 can store an event-outcome pair identified by the server 130.

The server 130 may employ a scenario detection unit 135. The scenario detection unit 135 may obtain input data 134 that corresponds to a real-time event. Input data 134 corresponding to the real-time event may be obtained, for example, from incoming real-time data records provided by feed servers 115-1 to 115-*n* or from the knowledge graph 150. The input data 134 may include, for example, a set of one or more attributes associated with a real-time event. One or more attributes associated with a real-time event may include data that describes a particular set of facts associated with an event. For example, the scenario detection unit 135 may receive a real-time data record event that includes attributes such as data indicating that precipitation is expected, that the precipitation type is snow, the event will occur in Oakton, Va., and the predicted accumulation for the storm is 6-12 inches of snow.

Though the use of the scenario detection unit 135 is described with reference to a snow storm, the present disclosure is not so limited. For example, the scenario detection unit 135 may analyze real-time data records or data stored in the knowledge base 150 and identify one or more attributes associated with other types of events identified in real-time data records or data stored in the knowledge base 150. For instance, the scenario detection unit 134 may analyze real-time data records from a news feed and determine that an election was held in the United Kingdom, that the incumbent lost the election, and that a conservative party defeated a liberal party in the election.

The scenario detection unit 135 may provide 136 the one or more attributes to the query unit 137. The query unit 137 may generate a query, based on the one or more attributes received from the scenario detection unit 135, and perform a search 138 of the knowledge graph 150 in order to determine identify a precedent that is consistent with the one or more attributes of the real-time event. For example, with reference to FIG. 1, the generated query may provide a request to the knowledge graph for "content item recommendations during a severe snow storm in Oakton, VA." Alternatively, as a different example with respect to the United Kingdom election, the query unit 137 could generate a query that requests "assets whose price increase when a conservative challenger beats a liberal incumbent in a United Kingdom election."

The knowledge graph 150 may receive the generated query, and process the generated query to determine whether there is one or more precedents in the knowledge graph 150 that satisfy the generated query. A precedent may include, for example, an event-outcome pair. An event-outcome pair may include a rule that has been established showing that when the event of the event-outcome pair occurs that there is a certain probability that the outcome of the event-outcome pair occurs. In the example of FIG. 1, the knowledge graph may return an event-outcome pair based on the newly discovered relationship 180 between the event entity "snow storm" 151 and the "top movie" 156 VOD offering. The event-outcome pair may be returned 139 to the query unit 137.

The processing of the query generated by the query unit 137 can be performed in near real-time without requiring the knowledge graph to be traversed for each query. This is because the server 130 front loads processing of relationships present in the knowledge graph 150 by generating and storing in volatile memory a set of the most common projections that can be generated by querying the knowledge graph 150. This functions to improve the speed with which relevant precedents can be identified by the server 130, thereby reducing latency involved predicting an outcome in response to an event.

The processing of the query generated by the query unit 137 is also made more efficient by the structure of the knowledge graph 150. That is, server 130 may maintain a knowledge graph that includes a main stem graph and a plurality of child graphs such as knowledge graph 150. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, and thereby increasing the overall performance speed of the disclosed system.

The query unit 137 may provide the received event-outcome pair to the scoring unit 141. The scoring unit 141 may perform one or more tests that evaluate a strength of the relationship identified in the event-outcome pair. In some implementations, the scoring unit 141 may determine whether the event of the event-outcome pair has historically been associated with triggering the outcome of the event-outcome. For example, the scoring unit 141 determines with what probability p that the outcome of the event-outcome pair occurs given the occurrence of the event. If the scoring unit 141 determined that p satisfies a predetermined threshold, then the scoring unit 141 may provide positive feedback to the knowledge graph 150 that strengthens the discovered relationship 180 between the occurrence of the "snow storm" and the purchase or rental of a "top movie" from a video on demand service. For example, the scoring unit 141 may increase the weight associated with the graph edge that represents the discovered relationship between entity 151 and entity 156.

Alternatively, the scoring unit 141 may determine that p does not satisfy a predetermined threshold. In such instances, the scoring unit may provide negative feedback to the knowledge graph 150 that weakens the discovered relationship 180 between the occurrence of the "snow storm" 151 and the purchase or rental of a "top movie" 156 from a video on demand service. For example, the scoring unit 141 may decrease a weight associated with the graph edge that represents the discovered relationship 180 between entity 151 and 156. In such instances the scoring unit 141 may instruct the notification unit 135 to generate an alert to a user device 110 indicating that the system anticipated there should be a relationship between a particular event (e.g., "snow storm") and another entity (e.g., "top movie"), but then determined via testing by the scoring unit 141 that the relationship has not historically existed (e.g., number of occurrences of the "snow storm" triggering purchase of "top movie" do not satisfy a predetermined threshold number of occurrences).

If the scoring unit 141 determines that the event of the event-outcome pair has historically been associated with triggering the outcome in the event-outcome pair, then the scoring unit 141 may transmit 143 data to the notification unit 144 to initiate execution a set of rules. The set of rules may define logic associated with the event-outcome pair that is configured to generate one or more parameter values that specify that the outcome will occur at a time that is subsequent to a time in which real-time data records, on which the request for a precedent was based, was received. By way of example, with reference to FIG. 2, the scoring unit may initiate execution of a set of rules that provide 146 a notification to a user via a user device 110 that the "top movie" will be a popular content item in Oakton, Va. when the snow storm hits.

The notification unit 144 is configured to provide 121 data to a user device 110 via a network 120 that can be used to produce user interface 111. By way of example, with reference to FIG. 1, the user interface 111 may include first data 112 that indicates that a severe snow storm has been detected for the location associated with the user device 110. In some implementations, the notification may also include second data 113 that recommends that the user of the user device should avoid travel and stay indoors between 3:00 pm and 10:00 pm, which is the predicted duration of the storm. In addition, the user interface 111 includes third data 114 that is indicative of a content item that is predicted by the system 100 to become popular in response to the snow storm. The notification that includes the third data 114 thus brings to a user's attention a popular content item whose popularity is predicted to spike based on the detection of a particular event (e.g., the snow storm). Once the notification is received, the user of the user device 110 can select to rent or purchase the content item "Top Movie." If the user of the user device 110 initiates the a "rent" or "purchase" transaction, the transaction request can be transmitted 122 to the server 130 (or other server) via the network 120 in order facilitate the requested transaction.

In other implementations, the notification unit 144 can also notify a user device 110 if an expected outcome does not occur in response to a particular event. For example, the system may maintain a portion of a knowledge graph related to sales on one or more products. Based on the facts maintained by the knowledge graph, it may be expected that the sale should trigger an increase in purchases of the sale product. However, the scoring unit 141 may determine that such sales have not historically been found to cause purchases of the sale product to increase. In such instances, the notification unit 144 may notify the user device indicating that the existence of the sale does not mean purchases of the product will increase. That is, the notification unit 144 can notify 146 a user device 110 in an effort to alert a user when an expected outcome is not occurring in response to a particular event.

The user device 110 may include, for example, a smartphone, a smartwatch, a tablet, a laptop computer, a desktop computer, or the like.

Aspects of the present disclosure have been described herein with reference to an example about an event entity being a "snow storm" 151 and a triggered outcome being a recommendation of a content item (e.g., "Top Movie" 156) that will become popular because of the "snow storm" (e.g., because more people will be home with the opportunity to watch video on demand movies since a weather service advised people not to travel in the severe snow storm. However, the present disclosure need not be so limited. For example, the system 100 can be used in other implementations to facilitate other types of recommendations. For example, the system 100 can use a knowledge graph similar to the knowledge graph 150 in order to analyze the effect of real world events on assets prices such as stock prices, real estate prices, commodity prices, or the like. For example, the system can perform the same operations described above in order to determine the effect on a company's share price. Other types of events may be analyzed to determine their outcome on a company's asset price such as weather events, changes in corporate governance, mergers and acquisitions, government policy announcements, and the like. Once such event-outcome relationships (e.g., product release makes company stock rise) are identified, the system can then perform backtesting using the scoring unit 141 to determine the strength of the identified event-outcome relationships.

Figure 2:
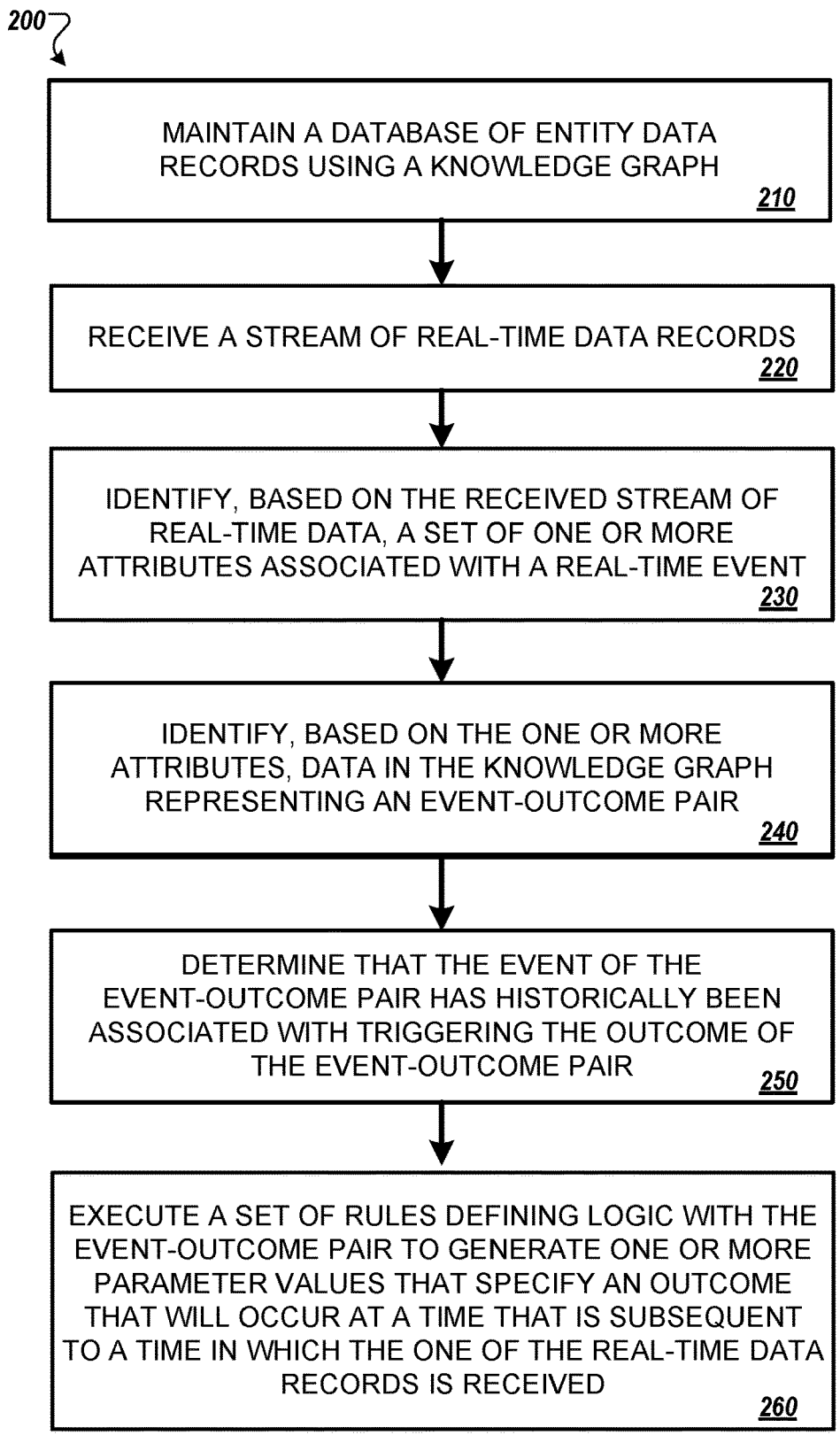
FIG. 2 is a flowchart of a process for providing a predicted outcome in response to a detected event.

FIG. 2 is a flowchart of a process 200 for providing a predicted outcome in response to a detected event. For convenience, the process 200 will described as being performed by a system of one or more computers located in one or more locations. For example, a system such as the system 100 can be appropriately programmed in accordance with this specification to perform the process 200.

A system can begin performance of the process 200 by maintaining 210 a database of entity data records using a knowledge graph. Maintaining a database of entity data records using a knowledge graph may include, for example, storing a database of entity data records and relationships between the entity data records using a knowledge graph. Alternatively, or in addition, maintaining a database of entity data records using a knowledge graph may include creating new relationships between entity data records as the new relationships are discovered and deleting existing relationships between entity data records as the existing relationships are determined to no longer provide a sufficient relationship between entity data records.

The system receives 220 a real-time stream of data records. As the real-time stream of data records is being received, from time to time, the system may perform operations described at stages 230 to 260.

The system identifies 230, based on the stream of real-time data, a set of one or more attributes associated with a real-time event represented by one of the received data records. Identifying a set of one or more attributes associated with a real-time event represented by one or more of the received data records may include analyzing the received real-time stream of data to detect the occurrence of one or more attributes associated with a particular real-time data record in the stream of real-time data. Alternatively, or in addition, the system may identify an event entity stored in the knowledge graph and extract one or more attributes from the stored event entity. The one or more attributes may include, for example, data that describes a particular set of facts associated with an event. For example, for a weather event, attributes may include that the precipitation type is snow, that the snow storm will occur in a particular type of location, or that the predicted accumulation for the storm is 6-12 inches of snow. By way of another example, another event entity could be an election in the United Kingdom. In such an instance, one more attributes associated with the election in the United Kingdom may include, for example that the election was held in the United Kingdom, that the incumbent lost the election, and that a conservative party defeated a liberal party.

The system identifies 240, based on one or more attributes, data in the knowledge graph representing an event-outcome pair. The system may generate a query based on the one or more attributes obtained in stage 230. The generated query can be used to perform a search of the knowledge graph 150 in order to identify a precedent that is consistent with (i) the one or more attributes of the real-time event or (ii) the event entity maintained in the knowledge graph. An example of a query that may generated by the system may include, for example, a query which recites "content item recommendations during severe snow storm in Oakton, VA." By way of another example, the query may recite "assets whose price increase when a conservative challenger beats a liberal incumbent in an election in the United Kingdom."

Identifying, based on the one or more attributes, data in the knowledge graph representing an event-outcome pair may include providing the generated query for execution against the knowledge graph. The generated query may be processed in order to identify one or more precedents maintained by the knowledge graph. A precedent may include, for example, an event-outcome pair. An event-outcome pair may include an established rule that has been established showing that when the event of the event-outcome pair occurs that there is a certain probability that the outcome of the event-outcome pair occurs. The processing of the query can be performed in near real-time without requiring the knowledge graph to be traversed for each query. This is because the server front loads processing of relationships present in the knowledge graph by generating and storing in volatile memory a set of the most common projections that can be generated by querying the knowledge graph. The front loaded processing and storage of the knowledge graph in volatile memory improve the efficiency of the system by, thereby reducing latency involved predicting an outcome in response to an event. The identified precedent may be returned to the query unit in response to search of the knowledge graph.

The system determines 250 whether the event of the event-outcome pair has historically been associated with triggering the outcome of the event-outcome pair. For example, the system may perform one or more tests that evaluate strength of the relationship identified in the event-outcome pair. In some implementations, the system may determine whether the event of the event-outcome pair has historically been associated with triggering the outcome of the event-outcome. In such implementations, the system may determine with what probability p that the outcome of the event-outcome pair occurs given the occurrence of the event. If the system determined that the p satisfies a predetermined threshold, then the system may provide positive feedback to the knowledge graph that strengthens the discovered relationship between the event of the event-outcome pair and the outcome of the event outcome pair. For example, the system may increase the weight associated with the graph edge that represents the discovered relationship between event entity (e.g., "snow storm") 151 of the event-outcome pair and the outcome entity (e.g., "Top Movie" 156) of the event outcome pair.

Alternatively, the system may determine that p does not satisfy a predetermined threshold. In such instances, the system may provide negative feedback to the knowledge graph that weakens the discovered relationship between the occurrence of the event entity (e.g., snow storm" 151) and the purchase or rental of a "top movie" 156 from a video on demand service. For example, the scoring unit 141 may decrease a weight associated with the graph edge that represents the discovered relationship 180 between entity 151 and 156.

If the system determines that the event of the event-outcome pair has historically been associated with triggering the outcome in the event-outcome pair, then the system may initiate execution a set of rules. The set of rules may define logic associated with the event-outcome pair that is configured to generate one or more parameter values that specify that the outcome will occur at a time that is subsequent to a time in which the one of the data records is received. By way of example, with reference to FIG. 1, the system may initiate execution of a set of rules that provide a notification to a user via a user device that recommend the outcome entity of the entity-outcome pair to a user for rental or purchase.

Figure 3:
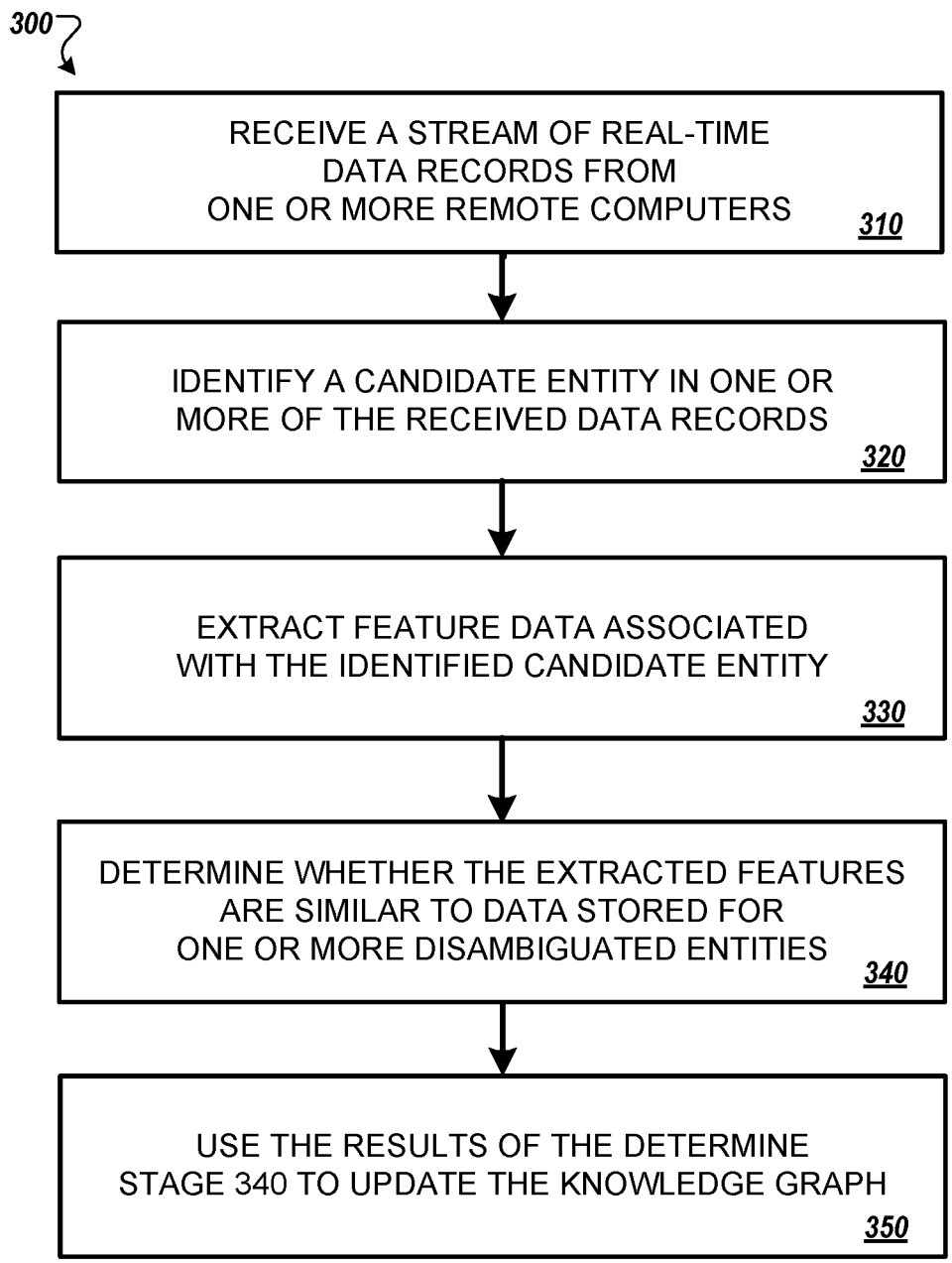
FIG. 3 is a flowchart of a process for detecting an entity in a real-time stream of one or more data records.

FIG. 3 is a flowchart of a process 300 for detecting an entity in a real-time stream of one or more data records. For convenience, the process 300 will be described as being performed by a system of one or more computers located in one or more locations. For example, a system such as the system 100 can be appropriately programmed in accordance with this specification to perform the process 300.

The system may begin to perform the process 300 by receiving 310 a stream of real-time data records from one or more remote computers. The system is configured to detect an occurrence of one or more entities in a received real-time data feed. An entity may include, e.g., a person, a company, corporation, a government agency, a government official, an asset, an event, a media content item, a country, a city, a state, entity profiles, or the like. Events may include the name (or type) of event and a date of the event. Events may include, for example, a storm (e.g., a hurricane, a tornado, a blizzard, a flood, a thunderstorm, a snowstorm, an ice storm, a hail storms, or the like), a terrorist attack, an act of nature (e.g., an earthquake), an environmental disaster (e.g., oil spill), corporate appointments (or resignations), governmental appointments (or resignations), mergers or acquisitions, a product launch, a speech by a government official, an interest rate changes, an asset price movement, an election, tweets from high profile individual, or the like. References to one or more entities may be included within a real-time data record received in a real-time data feed from one or more remote computers.

The system processes the received real-time data record to identify 320 the occurrence of one or more candidate entity names. Identifying the occurrence of one or more candidate entity names may include, for example, analyzing the text of a real-time data record to detect a string of text that is similar in structure to that of known entity names. In some implementations, the system may also identify contextual information that is associated with candidate entity name. Contextual information may include, for example, one or more other words in the real-time data record other than the candidate entity name that can be identified along with the candidate entity name. The contextual information in the real-time data record data record may provide context regarding the use of the candidate entity name in the real-time data records. In some implementations, the contextual information may include other words in the same sentence as the candidate entity name, other words in the same paragraph as the candidate entity name, or the like.

The system extracts 330 feature data associated with the candidate entity. Extracting features associated with the candidate feature entity may include, for example, extracting one or more features from (i) the identified candidate entity name, (ii) the contextual information, or (iii) a combination thereof. The one or more features may include data that can be used to numerically represent (i) the identified candidate entity name, (ii) the contextual information, or (iii) a combination thereof. The extracted features can be used to generate a feature vector that numerically represents the candidate entity name.

The system determines 340, based on the comparison of (i) the generated feature vector and (ii) one or more disambiguated entity names whether an entity corresponding to the candidate entity name is currently maintained by the knowledge graph. This may include, for example, determining the similarity of the generated feature vector to a feature vector generated for each entity node in the set of entity nodes maintained by the knowledge graph. In one implementation, the similarity between the feature vector representing the candidate entity name and each feature vector representing an entity in the knowledge graph may be determined, for example, using a cosine distance function.

The system uses the results of the determining stage at 340 to update the knowledge graph in response to determining that the candidate entity represented by the generated feature vector is associated with a previously identified entity. For example, in some instances, the system may determine that the feature vector generated for the identified candidate entity is sufficiently similar to an entity of the plurality of entities in the knowledge graph. In such an instance, the real-time data record associated with the candidate entity may become associated with the existing entity node. In other instances, the system may determine that there are no entities in the knowledge graph that are sufficiently similar to the generated feature vector that represents the candidate entity. In such instances, the system may generate a new entity root node.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a tablet, a smartwatch, a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, LED (light emitting diode) monitor, OLED (organic light emitting diode), for displaying information to the user and a keyboard and a pointing device, e.g., a mouse, trackball, or touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method performed by a data processing apparatus, comprising:
    maintaining a database of data records with a knowledge graph, wherein the knowledge graph comprises a main stem graph and a plurality of child graphs, wherein each child graph corresponds to a particular area of knowledge, wherein each child graph has its own overlay on top of the main stem graph, and wherein each child graph overlay belonging to a particular child graph is not shared with other child graphs;
    receiving a stream of real-time data that includes data records; and
    from time to time as the stream of real-time data is received:
        identifying, based on the stream of real-time data, a set of one or more attributes associated with a real-time event represented by one of the data records received;

determining a particular child graph of the plurality of child graphs that include data representing one or more data records related to a same area of knowledge as the real-time event;

identifying, based on the one or more attributes and by searching only a portion of the knowledge graph corresponding to the particular child graph, a data record in the particular child graph representing an event-outcome pair;

determining whether an event of the event-outcome pair identified in the particular child graph has historically been associated with triggering an outcome of the event-outcome pair; and in response to determining that the event of the event-outcome pair identified in the particular child graph has historically been associated with triggering the outcome in the event-outcome pair, executing a set of rules defining logic associated with the event-outcome pair, wherein execution of the set of rules generates one or more parameter values indicating that the outcome will occur at a time that is subsequent to a time in which the one of the data records is received.

2. The method of claim 1, the method further comprising:
in response to determining that the event of the event-outcome pair has not historically been associated with triggering the outcome in the event-outcome pair, providing negative feedback that weakens the relationship between the occurrence of the event in the event-outcome pair and the outcome entity in the event-outcome pair.

3. The method of claim 1, the method further comprising:
generating an alert for output on the display of a user device that includes data indicative of the specified outcome.

4. The method of claim 1, the method further comprising:
adding a new entity to the knowledge graph using a template, the template including a field for each attribute of a particular entity type.

5. The method of claim 1, wherein the set of rules define logic for generating an alert that includes data indicative of the specified outcome.

6. The method of claim 1, the method further comprising:
obtaining data indicative of facts related to one or more real-time events;
determining, based on the obtained data indicative of facts related to the one or more real-time events, a relationship between at least a first entity and a second entity in the knowledge graph that did not previously exist;
determining whether first entity has historically been associated with triggering the occurrence of the second entity; and
in response to determining whether the first entity has historically been associated with triggering the occurrence of the second entity, storing the first entity and the second entity as an event-outcome pair.

7. The method of claim 1, the method further comprising:
obtaining data indicative of facts related to one or more real-time events;
determining, based on the obtained data indicative of facts related to the one or more real-time events, that a relationship should not exist between at least a first entity and a second entity in the knowledge graph, wherein a relationship previously existed between the first entity and the second entity;

determining whether first entity has historically been associated with triggering the occurrence of the second entity; and in response to determining that the first entity has not historically been associated with triggering the second entity, removing the relationship between the first entity and the second entity in the knowledge graph.

8. The method of claim 1, wherein determining whether an event of the event-outcome pair has historically been associated with triggering an outcome of the event-outcome pair further includes:
determining whether the event of the event-outcome pair has been determined to trigger the particular outcome of the event-outcome pair more than a threshold amount of times.

9. The method of claim 1, the method further comprising:
determining that a second portion of the knowledge graph is to be divided to create a new child graph based on operations performed using the first portion of the knowledge graph; and
creating a new child graph using the second portion of the knowledge graph.

10. The method of claim 9, wherein the operations performed using the first portion of the knowledge graph include receiving updates, storing updates, and one or more knowledge graph maintenance operations.

11. A system comprising:
one or more computers and one or more storage devices storing instructions that are operable, when executed by one or more computers, to cause the one or more computers to perform the operations comprising:

maintaining a database of data records with a knowledge graph, wherein the knowledge graph comprises a main stem graph and a plurality of child graphs, where each child graph corresponds to a particular area of knowledge, wherein each child graph has its own overlay on top of the main stem graph, and wherein each child graph overlay belonging to a particular child graph is not shared with other child graphs;

receiving a stream of real-time data that includes data records; and from time to time as the stream of real-time data is received:
identifying, based on the stream of real-time data, a set of one or more attributes associated with a real-time event represented by one of the data records received;

determining a particular child graph of the plurality of child graphs that include data representing one or more data records related to a same area of knowledge as the real-time event;

identifying, based on the one or more attributes and by searching only a portion of the knowledge graph corresponding to the particular child graph, a data record in the particular child graph representing an event-outcome pair;

determining whether an event of the event-outcome pair identified in the particular child graph has historically been associated with triggering an outcome of the event-outcome pair; and in response to determining that the event of the event-outcome pair identified in the particular child graph has historically been associated with triggering the outcome in the event-outcome pair, executing a set of rules defining logic associated with the event-outcome pair, wherein execution of the set of rules generates one or more parameter values indicating that the outcome will occur at a time that is subsequent to a time in which the one of the data records is received.

12. The system of claim 11, the operations further comprising:
in response to determining that the event of the event-outcome pair has not historically been associated with triggering the outcome in the event-outcome pair, providing negative feedback that weakens the relationship between the occurrence of the event in the event-outcome pair and the outcome entity in the event-outcome pair.

13. The system of claim 11, the operations further comprising:
generating an alert for output on the display of a user device that includes data indicative of the specified outcome.

14. The system of claim 11, the operations further comprising:
adding a new entity to the knowledge graph using a template, the template including a field for each attribute of a particular entity type.

15. The system of claim 11, the operations further comprising:
obtaining data indicative of facts related to one or more real-time events;
determining, based on the obtained data indicative of facts related to the one or more real-time events, a relationship between at least a first entity and a second entity in the knowledge graph that did not previously exist;
determining whether first entity has historically been associated with triggering the occurrence of the second entity; and
in response to determining whether the first entity has historically been associated with triggering the occurrence of the second entity, storing the first entity and the second entity as an event-outcome pair.

16. The system of claim 11, the operations further comprising:
obtaining data indicative of facts related to one or more real-time events;
determining, based on the obtained data indicative of facts related to the one or more real-time events, that a relationship should not exist between at least a first entity and a second entity in the knowledge graph, wherein a relationship previously existed between the first entity and the second entity;
determining whether first entity has historically been associated with triggering the occurrence of the second entity; and
in response to determining that the first entity has not historically been associated with triggering the second entity, removing the relationship between the first entity and the second entity in the knowledge graph.

17. The system of claim 11, wherein determining whether an event of the event-outcome pair has historically been associated with triggering an outcome of the event-outcome pair further includes:
determining whether the event of the event-outcome pair has been determined to trigger the particular outcome of the event-outcome pair more than a threshold amount of times.

18. A non-transitory computer-readable medium encoded with instructions that, when executed by one or more computers, cause the one or more computers to perform the operations comprising:
maintaining a database of data records with a knowledge graph, wherein the knowledge graph comprises a main stem graph and a plurality of child graphs, where each child graph corresponds to a particular area of knowledge, wherein each child graph has its own overlay on top of the main stem graph, and wherein each child graph overlay belonging to a particular child graph is not shared with other child graphs;
receiving a stream of real-time data that includes data records; and
from time to time as the stream of real-time data is received:
identifying, based on the stream of real-time data, a set of one or more attributes associated with a real-time event represented by one of the data records received;
determining a particular child graph of the plurality of child graphs that include data representing one or more data records related to a same area of knowledge as the real-time event;
identifying, based on the one or more attributes and by searching only a portion of the knowledge graph corresponding to the particular child graph, a data record in the particular child graph representing an event-outcome pair;
determining whether an event of the event-outcome pair identified in the particular child graph has historically been associated with triggering an outcome of the event-outcome pair; and
in response to determining that the event of the event-outcome pair identified in the particular child graph has historically been associated with triggering the outcome in the event-outcome pair, executing a set of rules defining logic associated with the event-outcome pair, wherein execution of the set of rules generates one or more parameter values indicating that the outcome will occur at a time that is subsequent to a time in which the one of the data records is received.

19. The computer-readable medium of claim 18, the operations further comprising:
in response to determining that the event of the event-outcome pair has not historically been associated with triggering the outcome in the event-outcome pair, providing negative feedback that weakens the relationship between the occurrence of the event in the event-outcome pair and the outcome entity in the event-outcome pair.

20. The computer-readable medium of claim 18, the operations further comprising:
generating an alert for output on the display of a user device that includes data indicative of the specified outcome.

21. The computer-readable medium of claim 18, the operations further comprising:
adding a new entity to the knowledge graph using a template, the template including a field for each attribute of a particular entity type.

22. The computer-readable medium of claim 18, wherein the set of rules define logic for generating an alert that includes data indicative of the specified outcome.

23. The computer-readable medium of claim 18, the operations further comprising:
obtaining data indicative of facts related to one or more real-time events;
determining, based on the obtained data indicative of facts related to the one or more real-time events, a relationship between at least a first entity and a second entity in the knowledge graph that did not previously exist;

determining whether first entity has historically been associated with triggering the occurrence of the second entity; and in response to determining whether the first entity has historically been associated with triggering the occurrence of the second entity, storing the first entity and the second entity as an event-outcome pair.

24. The computer-readable medium of claim 18, the operations further comprising:

obtaining data indicative of facts related to one or more real-time events;

determining, based on the obtained data indicative of facts related to the one or more real-time events, that a relationship should not exist between at least a first entity and a second entity in the knowledge graph, wherein a relationship previously existed between the first entity and the second entity;

determining whether first entity has historically been associated with triggering the occurrence of the second entity; and in response to determining that the first entity has not historically been associated with triggering the second entity, removing the relationship between the first entity and the second entity in the knowledge graph.

25. The computer-readable medium of claim 18, wherein determining whether an event of the event-outcome pair has historically been associated with triggering an outcome of the event-outcome pair further includes:

determining whether the event of the event-outcome pair has been determined to trigger the particular outcome of the event-outcome pair more than a threshold amount of times.

\* \* \* \* \*